April 1, 1969 J. S. JACKSON ET AL 3,436,104
TUBE COUPLING
Filed Sept. 25, 1967

INVENTORS
JAMES S. JACKSON
MORTON D. REEBER

BY *J. B. Kraft*
ATTORNEY

United States Patent Office 3,436,104
Patented Apr. 1, 1969

3,436,104
TUBE COUPLING
James S. Jackson, Fishkill, and Morton D. Reeber, Shrub Oak, N.Y., assignors to International Business Machines Corporation, Armonk, N.Y., a corporation of New York
Filed Sept. 25, 1967, Ser. No. 670,281
Int. Cl. F16l 33/16, 17/00
U.S. Cl. 285—242          2 Claims

ABSTRACT OF THE DISCLOSURE

A coupling structure for joining a flexible tube end fitted around the end of a preferably rigid central tube. A first collar is mounted around the end portion of the central tube. The end of the flexible tube fits over the central tube end and the first collar. A second collar is mounted on the flexible tube intermediate the second tube edge and the first collar. The second collar opening is smaller than the perimeter of the flexible tube around the first collar. Fluid pressure in the coupled tubes extends the flexible tube which draws the second collar toward the first collar.

BACKGROUND OF THE INVENTION

Field of the invention

The present invention relates to coupling means for joining flexible tubing to other tubing including metal, plastic or glass tubing.

Description of the prior art

In laboratory and industrial applications in which fluids are conveyed through tubes under pressure, it is frequently desirable to bend or turn the paths of the conveying tube structures. While such bends and turns may be preformed in rigid tubes, in order to permit maximum latitude in design, it is often advantageous if the bends and turns may be made by flexible tubing which is coupled to relatively rigid tubing. The fluid is conveyed primarily through the joined rigid tubing in the relatively straight portions of the conveying structure.

Because such bends and turns are frequently very sharp, relatively thin flexible tubing must be used. The prior art has encountered problems in finding suitable coupling means for joining relatively thin, flexible tubing to other tubes in systems where fluid pressure is applied to the coupling. The fluid pressure stretches and extends the flexible tubing resulting in the phenomenon known as "creeping" which draws the flexible tubing out of the clamping or retaining structure in the coupling, causing leaks in the coupling. For example, the screw clamp is one standard means of coupling flexible tube ends fitted over rigid tube ends. The screw clamp diameter is adjusted to clamp the outer flexible tube against the inner or central tube. However, the fluid pressure applied to the flexible tubing causes the flexible tubing to "creep" which results in a narrowed outer diameter for the flexible tubing. This loosens the flexible tubing in the screw clamp. In order to compensate for the diminished diameter, it is necessary to continually monitor and adjust such screw clamp joints in order to avoid leaks.

Another standard coupling means for clamping flexible tube ends fitted over central tube ends is the spring clamp. This may be considered as self-adjusting to some extent, in that as flexible tube diameters shrink by "creeping," the spring tension on the clamp adjusts the diameter of the clamp to that of the flexible tubing. However, the decrease in diameter of the spring clamp results in an attendant decrease in tension of the clamp making the coupling more subject to leaking.

SUMMARY OF THE INVENTION

The present invention provides apparatus for coupling a flexible tube end fitted about a central tube which is not affected by the extension or "creeping" of the flexible tube under fluid pressure. The coupling structure of the present invention comprises a central tube, preferably rigid, a first collar mounted around the end portion of the central tube to be coupled, a flexible tube having a leading end fitted around both the central tube end and the first collar, and a second collar mounted on the leading end of the flexible tube intermediate the edge of the flexible tube and the point where the flexible tube passes over the first collar. The opening in the second collar is smaller than the perimeter of the flexible tube at the point where said tube passes over the first collar. When the pressure of the fluid in the coupled tubes extends the flexible tube causing "creeping," the second collar is apparently drawn by the "creeping" flexible tube towards engagement with the first collar, and the first collar is urged by the fluid pressure towards engagement with the second collar. This results in a clamping of the flexible tube at the point where it separates the two merging collars.

Accordingly, it is the primary object of the present invention to provide coupling means which are unaffected by changes in the flexible tube due to extension or "creeping."

It is another object to provide coupling means which apply increased force to the flexible tube as a result of extension or "creeping" of the tube.

It is another object to provide apparatus in which the "creeping" of the flexible tubing is actually utilized to increase the force which the coupling means applies to the tubing.

A further object is to provide clamping means which are compact and easily applied and removed without any tools.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 3:
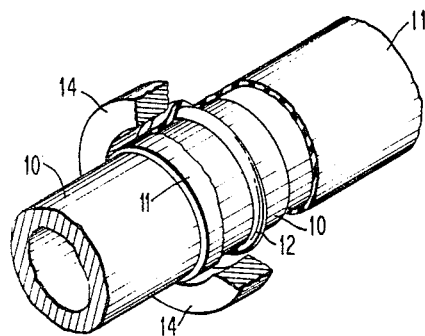
FIG. 3 is a broken, perspective view of the coupling of FIGS. 1 and 2.
Figure 1:
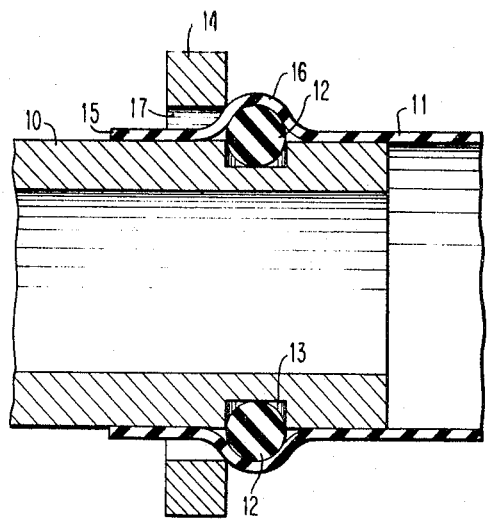
FIG. 1 is a longitudinal, section view of one preferred embodiment of the coupling of this invention before fluid under pressure is passed through the coupling.

Referring to FIGS. 1 and 3, internal or central tube 10, made of a rigid material such as metal, is to be coupled to outer flexible tube 11. Annular collar 12, preferably made of a resilient material, is mounted around the central tube 10 in a fixed position. The position of collar 12 is fixed by seating the collar in peripheral notch 13 formed peripherally on central tube 10. Outer tube 11, of a flexible material such as rubber, is fitted so that its leading end portion extends over the end of central tube 10 and over collar 12. Collar 14, preferably of a rigid material such as metal, is mounted around flexible tube 11 and central tube 10 at a point intermediate edge 15 of flexible tube 11 and point 16 at which flexible tube 11 fits over collar 12. At this position, collar 14 is loosely fitted about flexible tube 11 and may be manually slid towards edge 15 in dismantling the coupling. The perimeter of flexible tube 11 in the vicinity of point 16 is greater than opening 17 in collar 14. Thus, collar 14 cannot be moved past point 16.

Figure 2:
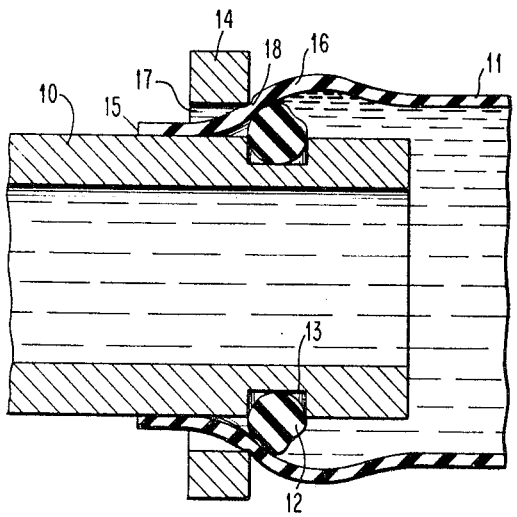
FIG. 2 is the same view as FIG. 1 at a stage when fluid under pressure is passing through the coupling.

Since the coupling is filled with fluid under pressure, as shown in FIG. 2, the pressure of the fluid is exerted against resilient collar 12, urging said collar toward collar 14. Collar 14, in turn, is drawn towards collar 12 by the action of the fluid which stretches or extends flexible tube 11 to move the end of the flexible tube and collar 14 seated thereon toward collar 12. This results in flexible tube 11 being constricted or clamped at point 18 between collar 12 and collar 14 to form a sealed coupling.

It should be emphasized that contrary to the operation of the clamping structures in most conventional coupling, increasing pressure of the fluid within the coupling instead of decreasing the clamping force of the clamp actually increases the clamping force on the tube structure. Increasing fluid pressure further extends flexible tube 11 which in turn further draws collar 14 toward collar 12.

Uncoupling of the joined tubes is relatively simple in the present apparatus. As the pressure within the tubes and coupling is decreased, extended flexible tube 11 returns to the initial slack position shown in FIG. 1, thus backing-off collar 14 from collar 12. Collar 14 may then easily be slid manually over edge 15 of the tube 11 in uncoupling the structure.

Where the coupling is to be located in such a position that there is a possibility of collar 14 falling gravitationally off end 15 of tube 11 when the coupling is in the initial position shown in FIG. 1, conventional means may be utilized to prevent such gravitational movement. In FIG. 1, any suitable means, such as teeth projecting from collar 14 to lightly engage tube 11, may be used to prevent such gravitational movement of collar 14 without interfering with any forward movement of the collar towards engagement with collar 12.

While collar 12 and outer tube 11 have been described as being made of resilient or flexible materials, and collar 14 and tube 10 have bene described as being made of rigid materials, it should be understood that these properties give one preferred embodiment. Except for tube 11 which must be flexible, the operation of the present invention comprehends combinations of collars and tubes having other relative resiliencies and rigidities. For example, the structure of the present invention operates in a satisfactory manner when collar 12 is relatively rigid.

Notch 13 shown in the preferred embodiment represents one means of retaining collar 12 on central tube 10 during the application of fluid pressure within the coupled tubes. Other means may be used for retaining collar 12 on the end of central tube 10. Where fluid pressures within the coupled tubes are relatively low, the frictional engagement of a tightly fitted collar around the central tube may be sufficient to retain collar 12 on the central tube. However, by the simple expedient of flaring the ends of central tube 10, as shown in FIG. 4, the flared portion 19 of the central tube acts as a stop to retain collar 12 on the end of central tube 10.

Figure 4:
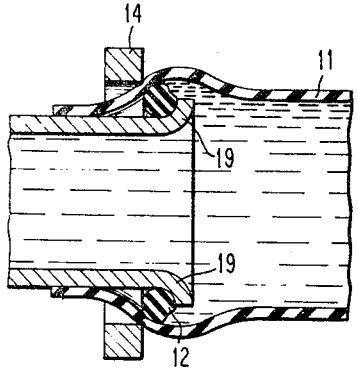
FIG. 4 is a longitudinal, sectional view of another embodiment of this invention.

The structure of FIG. 4 illustrates the advantages of the present invention which resides in its simplicity. A set of collars 12 and 14 may be used to couple flexible tubing to relatively rigid tubing in production or laboratory equipment conveying fluids. The flexible tubing and the rigid tubing may be stock tubing. The only modification which needs to be made would be the flaring of the rigid tube end. This is a simple industrial and laboratory procedure with glass, metal or plastic tubing.

While the invention has been particularly shown and described with reference to prefered embodiments thereof, it will be understood by those skilled in the art that the foregoing and other changes in form and details may be made therein without departing from the spirit and scope of the invention.

What is claimed is:
1. A tube coupling comprising:
a central tube of a substantially rigid material,
an elastic first collar mounted around an end portion of said central tube,
stop means for retaining the first collar on said central tube,
a flexible tube having a leading end fitting around the end portion of the central tube and said first collar, and
a second collar of a substantially rigid material slidably fitted around the leading end of the flexible tube intermediate the edge of said leading end and said first collar,
said second collar having an opening substantially greater than the perimeter of the leading end of the flexible tube and smaller than the perimeter of the flexible tube around the first collar, whereby the pressure of fluid passing through the coupling urges the first collar towards engagement with the second collar and extends the flexible tube drawing the second collar towards engagement with the first collar to clamp the flexible tube separating the two collars.
2. The tube coupling of claim 1 wherein said stop means are a peripheral notch for seating said first collar formed in the end portion of said central tube.

References Cited

UNITED STATES PATENTS

| 585,014 | 6/1897 | Wenzel et al. | 285—239 |
| 2,793,057 | 5/1957 | McGugin | 285—242 X |
| 2,958,722 | 11/1960 | Rubin et al. | 285—239 X |

FOREIGN PATENTS

| 1,152,473 | 9/1957 | France. |
| 168,493 | 9/1959 | Sweden. |

THOMAS F. CALLAGHAN, *Primary Examiner.*